United States Patent [19]

Lopes

[11] Patent Number: 4,746,099

[45] Date of Patent: May 24, 1988

[54] CAM ACTION FISH TAPE PULLER

[76] Inventor: Edward L. Lopes, 466 N. Richard, Orange, Calif. 92667

[21] Appl. No.: 23,653

[22] Filed: Mar. 9, 1987

[51] Int. Cl.⁴ .............................................. B65H 59/00
[52] U.S. Cl. ............................ 254/134.3 FT; 294/114
[58] Field of Search ............... 254/134.3 FT, 134.3 R, 254/245, 250, 254, 256, 259; 294/113, 114; 269/272; 81/419

[56] References Cited

U.S. PATENT DOCUMENTS

| | | | |
|---|---|---|---|
| 976,600 | 11/1910 | Rhodes | 254/31 |
| 1,932,540 | 10/1933 | Whipple | 254/29 R |
| 2,374,406 | 4/1945 | Bezzerides | 254/29 R |
| 2,736,532 | 2/1956 | Hughes | 254/134.3 FT |
| 3,329,045 | 7/1967 | Sellen et al. | 254/134.3 R |
| 3,763,722 | 10/1973 | Ehrens | 254/134.3 FT |

FOREIGN PATENT DOCUMENTS 93355  3/1922  Switzerland ........................ 254/256

Primary Examiner—Robert C. Watson
Attorney, Agent, or Firm—William L. Chapin

[57] ABSTRACT

A tool for gripping and pulling steel fish tapes of the type used to pull electrical wiring through conduits and passageways in building construction comprises identical jaw pieces and elongated, rearward extending handlebars. The outer half of each jaw piece has a forward extending jaw member having a convex front surface facing a flat anvil plane formed in a cutout rear half section of the opposite jaw piece. The two jaw pieces are joined by a transversely disposed pivot pin such that a forward extending jaw member is pivotable within the cutout section of the opposite jaw piece, forming a pivotable interdigitated structure. The axis of the pivot pin is located eccentrically with respect to the convex front surface of the forward extending jaw member, thereby providing as the handlebars are pivoted into colinear alignment, a decreasing space between the jaw member and the anvil plane for gripping a fish tape inserted therebetween.

8 Claims, 1 Drawing Sheet

CAM ACTION FISH TAPE PULLER

BACKGROUND OF THE INVENTION

1. Field of the Invention

This invention relates to tools for manipulating steel tapes. More particularly, the invention relates to tools which are useful for gripping and pulling steel leader tapes, referred to as fish tapes, which are used to pull attached electrical wires through building walls.

2. Description of Background Art

Fish tapes are flexible steel tapes availabe in various lengths and used to "fish" attached electrical wires through walls and floors of structures in which new electrical wiring is being installed. A typical fish tape has a hook at one end adapted to attachment to the end of an electrical wire. The hooked end of the tape is inserted into the opening of a conduit or other passageway through which it is desired to string an electrical cable. The tape is then fed into the conduit by pushing on the slack end, until the hook emerges from the conduit. The hook is then attached to the end of the electrical cable. After the hook has been attached to the end of the cable, a pulling force is applied to the opposite end of the tape, pulling the tape and attached cable through the conduit.

Typical fish tapes are $\frac{1}{4}''$ to 5/16" wide, about 1/16" thick, and are supplied in reels containing 100 or 200 feet of tape. Frequently, substantial frictional resistance is encountered between the surfaces of the electrical wires and the walls of the conduits or passageways through which the wires are being pulled. Overcoming this frictional resistance makes it necessary to exert a large pulling force on the free end of the fish tape in pulling the wire all the way through the passageway.

Since it is difficult to exert a large pulling force on the free end of a fish tape with bare hands, pliers are sometimes used to grasp the free end of the fish tape to permit application of a larger pulling force. However, in practice, the jaws of the pliers frequently slip off of and damage the fish tape. Thus, the use of pliers provides a less than satisfactory solution to the problem of exerting a large pulling force on the fish tape.

In an effort to improve upon the pliers as a tool for pulling fish tapes, various tools have been devised. These include tools disclosed in the following U.S. patents: Goodall, U.S. Pat. No. 1,880,431, Oct. 4, 1932, Tool For Forcing and Drawing an Element Through Conduits; Patterson, U.S. Pat. No. 1,939,187, Dec. 12, 1933, Fish Tape Puller; Hughes, U.S. Pat. No. 2,736,532, Feb. 28, 1956, Tool For Pushing or Pulling Fish Tape Through a Conduit; and Ehrens, U.S. Pat. No. 3,763,722, Oct. 9, 1973, Gripping and Pulling Tool for Retracting Guide Tapes From Conduit While Pulling Electrical Wires Into the Conduit.

The tools disclosed in the above-cited references may be useful in performing their intended function. However, the present invention was conceived of to provide a fish tape pulling tool of advantageous design and function.

OBJECTS OF THE INVENTION

An object of the present invention is to provide a tool capable of exerting a large pulling force on a fish tape without damaging it.

Another object of the invention is to provide a fish tape pulling tool which can produce a uniform pulling force on a fish tape, thereby minimizing the possibility of kinking the fish tape.

Another object of the invention is to provide a fish tape pulling tool having a minimum number of parts, thereby minimizing the cost of fabrication of the tool.

Another object of this invention is to provide a fish tape pulling tool having pairs of substantially identical parts, thereby minimizing the cost of manufacturing the tool.

Another object of the invention is to provide a fish tape pulling tool which is simply and easily operated.

Various other objects and advantages of the present invention, and its most novel features, will become apparent to those skilled in the art by reading the accompanying specification and claims.

It is to be understood that although the invention disclosed herein is fully capable of achieving the objects and providing the advantages described, the description of the invention contained herein is merely illustrative of the preferred embodiment. Accordingly, I do not intend that the scope of my exclusive rights and privileges in the invention be limited to the details of the embodiment described. I do intend that reasonable equivalents, adaptations and modifications of the present invention which is described herein be included within the scope of the invention as particularly pointed out in the appended claims.

SUMMARY OF THE INVENTION

Briefly stated, the present invention comprehends a tool for gripping and pulling a steel fish tape which has a pivotable eccentric or cam member which pivots to form a narrowing distance between the face of the cam and a flat jaw surface, tightly squeezing a fish tape inserted between the cam and jaw. The tool includes two identical elongated halves joined pivotably on a pivot axis transverse to the longitudinal axis of the two halves, and spaced equidistant between the outer transverse end faces of the two halves.

Each half of the tool consists of a block-shaped end or jaw piece having a convex front surface on one side of the block, and a notch with a flat vertical rear surface forming an anvil plane cut into the other side of the jaw piece and extending to the longitudinal, vertical midplane of the jaw piece. The jaw pieces are joined by a transversely disposed, horizontal pivot pin to form a pivotable, interdigitated structure in which each convex front surface of a jaw piece faces an anvil plane of the opposite jaw piece. Since the convex front surface of an end piece is eccentrically disposed with respect to the axis of the pivot pin, it functions as a cam member. Thus, pivoting the handles into colinear alignment causes the convex cam surface to move closer to the flat vertical surface, gripping a fish tape inserted between the two surfaces.

DETAILED DESCRIPTION OF THE INVENTION

Figure 1:
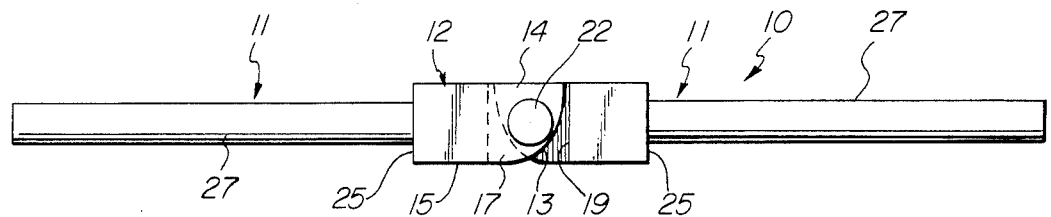
FIG. 1 is a front elevation view of the fish tape pulling tool according to the present invention, with the tool in a closed position.

Referring now to FIGS. 1 through 5, a cam action fish tape pulling tool 10 according to the present invention is illustrated. As shown in the Figures, tool 10 includes left and right halves 11 which are identical. Each half 11 of tool 10 includes a generally block-shaped inner end piece or jaw piece 12. As shown in the elevation views of FIGS. 1, 3 and 6, jaw piece 12 is generally block-shaped, and has in elevation view a longitudinally elongated, rectangular cross-sectional shape with a convex front jaw surface 13. The convex front jaw surface 13 joins the upper flat surface plane 14 of the jaw piece 12 to the lower flat surface plane 15 of the jaw piece.

Figure 2:
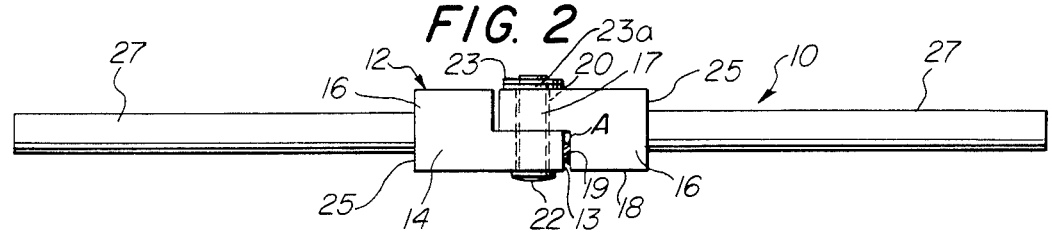
FIG. 2 is an upper plan view of the tool of FIG. 1, showing a fish tape being gripped by the tool.
Figure 3:
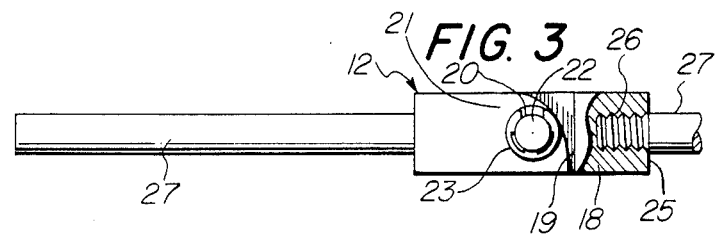
FIG. 3 is a partially sectional rear elevation view of the tool of FIG. 1.
Figure 4:
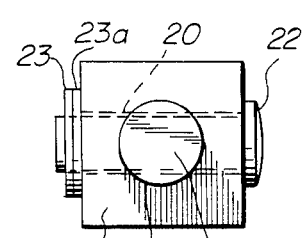
FIG. 4 is an enlarged end view of the tool of FIG. 1.
Figure 5:
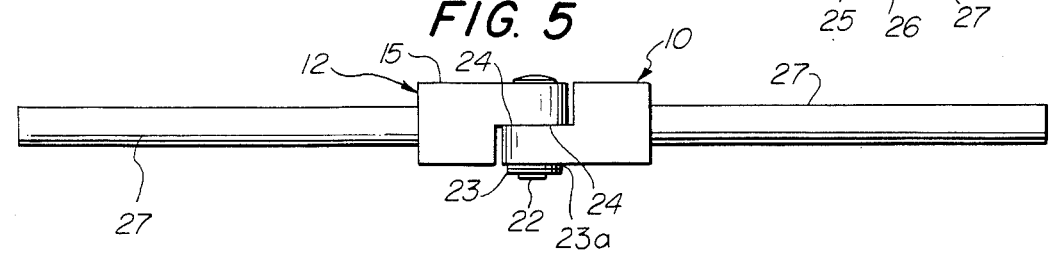
FIG. 5 is a bottom plan view of the tool of FIG. 1.

As may be seen best by referring to the upper and lower plan views of tool 10 shown in FIGS. 2 and 5, respectively, jaw piece 12 has a uniform thickness rectangular plan-view cross-sectional shape rear section 16. As illustrated in the front and rear elevation views of tool 10 shown in FIGS. 1 and 3, respectively, rear section 16 has a uniform thickness rectangular elevation-view cross-sectional shape.

Referring again to FIGS. 2 and 5, it may be seen that forward protruding front section 17 of jaw piece 12 having the convex front jaw surface 13 previously referred to has a transverse thickness dimension of approximately one-half the thickness dimension of the rear section 16. Thus, front section 17 has a shape which could be visualized as being formed by cutting the front half of the front section of the jaw piece 12 by two perpendicular cutting planes; a first, longitudinally disposed vertical cutting plane extending backwards from the vertical front plane of the jaw piece along a transverse vertical mid-plane of jaw piece, and a second vertical cutting plane extending perpendicularly inwards from the vertical side plane 18 of the jaw piece. The intersection of the two cutting planes forms a vertically disposed anvil plane 19.

As shown in FIGS. 1 through 6, the front section 17 of jaw piece 12 of tool 10 contains a hole 20 disposed through its thickness dimension perpendicularly inwards from the outer side face 21 of the front section. Hole 20 is adapted to receive a headed pivot bolt 22. The shank of pivot bolt 22 contains an annular groove adapted to receive a lock ring 23 which pivotably secures together the two halves 11 of tool 10. A flat washer 23A underneath the lock ring 23 provides bearing surfaces between the lock ring and the adjacent outer surface of the jaw piece 12. As may be seen best be referring to FIGS. 2 and 5, the inner side faces 24 of front section 17 are secured in parallel sliding alignment with pivot bolt 22 secured with lock ring 23.

As shown in FIGS. 1 through 6, rear section 16 of jaw piece 12 has a flat vertical rear surface 25 containing a threaded blind hole 26 extending perpendicularly inwards therefrom. An elongated threaded handlebar 27 is screwed into threaded blind hole 26 to secure the handlebar to the jaw piece 12.

Figure 6:
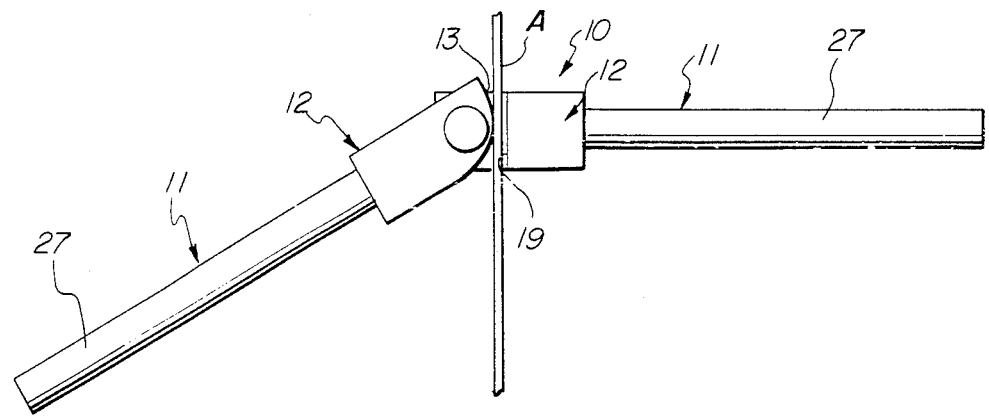
FIG. 6 is a front elevation view of the tool of FIG. 1 with the tool in an open position and showing a fish tape inserted into the tool.

Tool 10 is used as follows. Referring now to FIG. 6, the end of flexible steel fish tape A is inserted between the convex front jaw surface 13 of a jaw piece 12, and the adjacent anvil plane 19 of the opposite jaw piece. Handlebars 27 of tool 10 are then pivoted into colinear alignment, as shown in FIGS. 1 through 5.

The convex front jaw surface 13 is eccentrically positioned with respect to the axis of the pivot bolt 22 such that there is a clearance of slightly less than the thickness of the fish tape between the upper portion of convex front jaw surface 13 and anvil plane 19 when the handles are aligned. Therefore, with the handlebars 27 aligned, tape A is securely and uniformly clamped between the convex jaw surface and the anvil plane.

With tape A thus securely clamped between jaw pieces 12, handlebars 27 may be securely grasped by opposite hands of the operator, permitting him to efficiently apply a substantial pulling force on tape A. This pulling force is directed along the longitudinal axis of the tape. Thus, the cam action fish tape puller according to the present invention provides an efficient means for exerting a substantial pulling force on a fish tape, without kinking, marring or otherwise damaging the fish tape.

What is claimed is:

1. A tool for gripping a tape comprising:
   (a) a first jaw piece having a block-shaped rear section, said block-shaped rear section having an essentially flat front surface, and having a forward extending jaw member of less transverse thickness than said rear section, said forward extending jaw member having a convex front surface,
   (b) a second jaw piece, identical to said first jaw piece, and
   (c) pivot means joining said first and second jaw pieces with said convex front surface of said forward extending jaw member of said first jaw piece adjacent said front surface of said block-shaped rear section of said second jaw member, the axis of said pivot means being disposed transversely to said first and second jaw pieces and located eccentrically with respect to said convex front surface of said forward extending jaw member, whereby pivoting said jaw pieces in a vertical plane reduces the spacing between said jaw surfaces.

2. The tool of claim 1 further comprising elongated handlebars extending rearward from the rear surface of said first and second jaw pieces, the axes of said handlebars being perpendicularly disposed to the axis of said pivot means.

3. The tool of claim 2 wherein said elongated handlebars are identical.

4. The tool of claim 3 wherein said handlebars are elongated, uniform transverse cross-sectional shape bars.

5. A tool for grasping and pulling fish tapes comprising:
   (a) a first jaw piece having the general shape of a horizontally elongated, rectangular cross-section bar, said bar having a rear, block-shaped quarter section removed to form a vertically disposed anvil surface, the front quarter section of said bar having a forward extending jaw member having a convex front surface extending perpendicularly inwards from the front side plane of said bar,
   (b) a second jaw piece identical to said first jaw piece, and
   (c) a transversely disposed pivot pin joining said first and second jaw pieces such that the convex front surface of each forward extending jaw member faces the vertically disposed anvil surface of an opposing jaw piece, the axis of said pivot pin being located eccentrically with respect to said convex front jaw surface, whereby pivoting said jaw piece in a vertical plane reduces the spacing between each of said convex front surfaces of said forward extending jaw member and the adjacent anvil surface of a said opposite jaw member, forming therebetween means for gripping a fish tape located between the surfaces of said jaw members.

6. The tool of claim 5 further comprising a pair of elongated handlebars, one of said handlebars extending rearward from the rear end plane of each of said jaw pieces.

7. The tool of claim 6 wherein each of said handlebars is an elongated, uniform transverse cross-sectional shape bar.

8. The tool of claim 7 wherein each of said jaw pieces contains a blind threaded bore extending perpendicularly inwards from the rear end face of said jaw piece and the inner end of each of said handlebars is externally threaded and screwed into said blind threaded bore.

* * * * *